United States Patent Office 3,630,980
Patented Dec. 28, 1971

3,630,980
PRESSURE-SENSITIVE HOT MELT ADHESIVES
Thomas E. Russell, Verona, N.J., assignor to The Flintkote Company, White Plains, N.Y.
No Drawing. Filed June 25, 1968, Ser. No. 739,653
Int. Cl. C09j 3/26
U.S. Cl. 260—27
11 Claims

ABSTRACT OF THE DISCLOSURE

A pressure-sensitive adhesive composition having instant room temperature tack, good cold flow resistance and good shear strength which comprises as a first component a resinous copolymer of ethylene and vinyl acetate, as a second component a resinous rubbery block copolymer of styrene and butadiene or isoprene, and as a third component a modified or unmodified rosin, a coumarone-indene resin, a polyterpene resin, a diene-olefin aliphatic hydrocarbon resin or a polystyrene resin.

---

This invention relates to pressure-sensitive adhesives, and more particularly to pressure-sensitive adhesives that have instant room temperature tack, good cold flow resistance and shear strength, form bonds that are essentially unaffected by moisture, and can be made as hot melts without solvents.

Countless uses exist for pressure-sensitive adhesives that have good quick tack at ordinary temperatures, adhere to numerous surfaces upon contact with essentially no pressure, are essentially free of cold flow, so-called "creep," resist shearing stresses, do not deteriorate under moist conditions and retain their desirable properties during prolonged periods of storage, i.e., have good shelf-life. Such uses include thinly coating the adhesives onto the under surfaces of floor tiles and wall tiles that can be set quickly and permanently on floors or walls. The pressure-sensitive adhesives of this invention are especially suited for making floor and wall tiles of the so-called "peel and stick" type, which are coated by the manufacturer and protected by an adhesive-resisting film that can be peeled off at a job-site.

An object of this invention is to provide pressure-sensitive adhesives. Another object of this invention is to provide pressure-sensitive adhesives that have good instant tack, high strength in shear, virtually no cold flow, resistance to moisture and storage stability. A further object of this invention is to provide a method for making such pressure-sensitive adhesives by hot-melt means without solvents. These and other objects of this invention will be in part discussed in and in part apparent from the following more detailed disclosure.

Broadly the pressure-sensitive adhesives of this invention contain three resinous components which, in intimate combination with one another in the proportions specified, provide the desirable properties herein before discussed. The primary components are a resinous copolymer of ethylene and vinyl acetate, a resinous rubbery block copolymer of styrene and butadiene or styrene and isoprene, and a modified or unmodified rosin, coumarone-indene resin, polyterpene resin, diene-olefin aliphatic hydrocarbon resin or polystyrene. Other ingredients can, of course, be included in the adhesives to attain additional desiderata, for example, an antioxidant to protect the various resins, especially during hot-melt blending and coating of the adhesive compositions in molten condition onto substrates such as wall and floor tiles.

Ethylene/vinyl acetate copolymers suitable for use according to this invention can vary in the proportions of ethylene monomer and vinyl acetate monomer in the copolymer, and also in the proportion of copolymer incorporated with the other components of the adhesives. Such copolymers can contain from about 15% to about 60% by weight of vinyl acetate, desirably from about 30% to about 50% and preferably from about 40% to about 45% by weight of vinyl acetate, based on the weight of the copolymer. Commercially available ethylene/vinyl acetate copolymers that are especially suited for making the pressure-sensitive adhesives of this invention are sold under the trade designation "Elvax." For example, Elvax 40 contains about 40% vinyl acetate, has a softening point of about 200° F. and has a melt index (ASTM D 1238, Modified) of 55 g./10 min.; Elvax 250 contains about 28% vinyl acetate, has a softening point of about 280° F. and has a melt index of 12 to 18; Elvax EP 3643 contains 45% vinyl acetate, has a softening point of about 190° F. and has a melt index of 110. Ethylene/vinyl acetate copolymeric resin can be included in the instant adhesives in amounts ranging from about 20% by weight of the tri-component compositions, and preferably from about 30% to about 45%. Also, it is possible to utilize more than one ethylene/vinyl acetate copolymer in a particular adhesive composition. For example, cold flow and melt temperature for blending and for application can be modified, as might be desired, by the selection as well as the proportioning of the different available ethylene/vinyl acetate resins.

Rubbery block copolymers of styrene and butadiene or styrene and isoprene that are especially advantageous to use in the instant adhesives are those in which the monomers are not randomly mixed but rather are in groups of poly-monomers, i.e., groups or blocks of polystyrene-polybutadiene-polystyrene or polystyrene-polyisoprene-polystyrene. The polystyrene groups have molecular weights of from about 5,000 to about 125,000, preferably between about 8,000 and 45,000, whereas the polybutadiene or polyisoprene blocks have molecular weights of between about 15,000 and about 250,000, preferably from about 35,000 to about 150,000. The copolymers can contain from about 20% to about 80% of either block polymer. Such rubbery block copolymers are commercially available under the trade name "Kraton," for example, Kraton 101 and 102 which are polystyrene-polybutadiene-polystyrene copolymers, and Kraton 107 which is their polyisoprene counterpart. They can be used in amounts of between about 10% and about 30% by weight of the adhesive composition, preferably from about 12% to about 18% by weight. Combinations of different rubbery block copolymers also can be used.

The third principal component of the subject adhesives can be a modified or unmodified rosin, polyterpene, coumarone-indene, diene-olefin aliphatic hydrocarbon or polystyrene resin. Such rosins include ethylene glycol, polyethylene glycol, glycerol and pentaerythritol rosin esters, hydrogenated rosin esters or methylated rosin esters, for example, the commercially available materials "Stabelite" Ester 3 triethylene glycol ester of hydrogenated rosin and Ester 10 glycerol ester of hydrogenated rosin, "Foral" 85 and 105 highly stabilized ester resins of pentaerythritol and rosin purified by steam distillation, and "Pentalyn" H and rosin base, "Herocolyn" D hydrogenated methyl ester of rosin purified by steam distillation, and "Pentalyn" H pentaerythritol ester of hydrogenated rosin, all sold by Hercules Powder Company. Suitable terpene resins are, for example, poly-($\alpha$-pinene) such as "Piccolyte Alpha" 25 and 115 having molecular weights of 125 and 1200, and poly-($\beta$-pinene) such as "Piccolyte" S–100 and S–115 having molecular weights of about 1200, Coumarone-indene resins that can be used advantageously include those sold under the names "Piccovar" L–30 and L–60, which have molecular weights of about 600 to 700, "Nevillac" Hard, a phenol-modified coumarone-indene resin of molecular weight from 200 to 500 and R–6 "Nevindene." Diene-olefin aliphatic hydrocarbon resins are, for example, "Piccopale" 85, 100 and 110, which have molecular weights of about 1000, 1400 and 1500. The polystyrene resins are of intermediate molecular weight, e.g., from about 300 to about 6000, preferably to about 1000. Suitable commercially available resins include "Piccolastic" A, D and E series, especially the A series. These third-component resins can be used in the adhesives in an amount of from about 25% to about 70% by weight, preferably between about 45% and about 60%. They also can be used in combination. For example Pentalyn K pentaerythritol ester of dimeric resin acids (softening point 376° F.) and Hercolyn D (a liquid at room temperature) can be proportioned together to provide a range of softening point, e.g., preferably 250° F. to 300° F., to obtain satisfactory cold flow resistance at room temperature and also coatability at elevated temperatures.

From about 0.01% to about 2.0% by weight of one or more antioxidants desirably are added to the adhesives. Antioxidants known to be effective for the various components, especially for the rubbery block copolymer and the ethylene/vinyl acetate copolymer, can be used. Such antioxidants include, for example, "Ionox" 220 4,4-methylene-bis(2,6-di-t-butyl-phenol) and 330 tris(di-t-butyl-p-hydroxybenzyl)-trimethylbenzene, "Dalpac" 4C 2,6-di(t-butyl)-p-cresol, "Naugawhite" alkylated bis-phenol, and "Butyl Zimate" zinc dibutyl dithiocarbamate. Ordinarily about 0.05% to about 1.0% of antioxidant, based on the amount of the adhesive composition, is sufficient.

The rubbery polystyrene-poly(conjugated diene)-polystyrene block copolymers are thermoplastic in nature and have no sharp melt point. Thus they cannot simply be melted with the other resins in any appreciably significant amount. It has been found possible, however, to avoid using a solvent for the rubbery copolymers, and instead to prepare the pressure-sensitive adhesives of this invention by a hot-melt technique. An additional benefit of the method is that the adhesives can be melt coated onto suitable substrates; solvent coating systems are unnecessary.

Initially a rubbery block copolymer, which ordinarily is produced in crumb form, is mechanically mixed with some or all of the ethylene/vinyl acetate copolymeric component to form an intimate, meltable mix. It is generally good practice to preblend the two components in amounts of ethylene/vinyl acetate ranging from about one-half to about equal the amount of the block copolymer, preferably at least about three-quarters. Mastication of the two preblended resins can be accomplished in an ordinary rubber mill or other high shear kneading or milling devices, for example, a Banbury Mill. Preblending is at room temperature or up to about 150° F. Although it is possible to work at either lower or higher temperatures, practical factors tend to preclude doing so, for example, degradation of the resins and difficulty of blending and removing them. Preblending in a rubber mill at room temperature ordinarily requires in the order of about one-half to about three hours, usually about one hour, to prepare a uniform mix of rubbery, crepe-like consistency. The meltable preblend thus prepared can be diced or sliced for convenient subsequent melting.

The adhesive composition is completed by melting the preblended mix in an agitated vessel heated at from about 270° F. to about 400° F., usually about 325° to 375° F. An antioxidant can be added as soon as it will readily mix with the melting preblend. Thereafter the other components of the adhesive are added directly to the hot melt. Preferably, any of the ethylene/vinyl acetate resin that was not preblended is added first, followed by addition of the modified or unmodified rosin, polyterpene, coumarone-indene, diene-olefin or polystyrene resin component. The entire batch is blended until a clear, smooth-running, homogeneous composition is formed. The composition can be coated onto a substrate, for example, in coatings from about 1 to about 5 mils thick, preferably about 2 to 4 mils, or can be cooled to a resilient, tacky solid at room temperature for subsequent remelting and application, e.g., at about 350° F.

The following illustrative examples of specific embodiments are set forth to facilitate understanding of the invention.

EXAMPLE 1

A mix of 12.75 parts (by weight unless otherwise specified) of Kraton 107 polystyrene-polyisoprene-polystyrene block copolymer crumb and 12.75 parts of Elvax 40 ethylene/vinyl acetate copolymer resin was masticated in a rubber mill for about one hour at room temperature until a uniform, crepe-like composition was formed. The preblend was then melted at about 325° F. to 350° F. in a heated vessel having a stirrer. An antioxidant, 0.50 part of Ionox 330 hindered phenol, was added as the composition melted. Thereafter 26.00 parts of Elvax EP–3643 were added to the hot melt in the vessel, after which 19.15 parts of Piccovar L–60, 9.70 parts of Piccovar L–30 and 19.15 parts of R–6 Nevindene coumarone-indene resins were added to the hot melt. Mixing of the hot melt was continued for about one-half hour until a clear, smoothly-flowing, homogeneous composition was formed. The composition was poured into a mold and cooled to a resilient block at room temperature.

A portion of the solid adhesive composition thus prepared was melted and coated at about 300° F. onto 9" × 9" vinyl-asbestos floor tiles. The pressure-sensitive coating, which was about 4 mils thick on the tiles, had good quick tack, good pressure-sensitivity and virtually no cold flow. Some of the tiles were placed on a cleaned concrete floor on which they had excellent shear strength. Similar results were obtained with other tiles placed on a vertical plywood wall.

The adhesive composition was coated onto various materials and tested for peel strength (Pressure Sensitive Tape Council #1, at 180° F.). The results were 154 ounces per inch on plywood and greater than 160 oz./in. on stainless steel, asbestos cement and vinyl asbestos substrates. The results were essentially the same both after four months under water and after accelerated shelf life at 130° F. The alkaline nature of the moist cement did not affect the adhesion. Silicon-treated parchment paper was placed on the adhesive coatings during storage, and could be peeled off easily for use.

A coating 2 mils thick on a vinyl asbestos tile panel produced a shear adhesion, or "holding power," at 130° F. (P.S.T.C. #7) of 25 minutes.

EXAMPLE 2

A pressure-sensitive hot-melt adhesive was prepared substantially according to the method described in Example 1 from a preblend of 18.10 parts of Kraton 107 and 32.00 parts of Elvax EP 3643 to which preblend were added 34.85 parts of R–6 Nevindene, 15.00 parts of Piccovar L–30 and 0.05 part of Ionox 330. After coating the adhesive onto various substrates, similar satisfactory results as described in Example 1 were obtained.

EXAMPLE 3

A pressure-sensitive hot-melt adhesive was prepared substantially according to the method described in Example 1 from a preblend of 15.40 parts of Kraton 107 and 27.30 parts of Elvax EP 3643, to which preblend were added 29.25 parts of R-6 Nevindene, 28.00 parts of Piccovar L-30 and 0.05 part of Ionox 330. After coating the adhesive onto various substrates, similar satisfactory results as described in Example 1 were obtained.

EXAMPLE 4

A pressure-sensitive hot-melt adhesive was prepared substantially according to the method described in Example 1 from a preblend of 17.40 parts of Kraton 107 and 30.40 parts of Elvax EP 3643, to which preblend were added 33.70 parts of R-6 Nevindene, 18.45 parts of Piccovar L-30 and 0.05 part of Ionox 330. After coating the adhesive onto various substrates, similar satisfactory results as described in Example 1 were obtained.

EXAMPLE 5

A pressure-sensitive hot-melt adhesive was prepared substantially according to the method described in Example 1 from a preblend of 12.70 parts of Kraton 101 and 13.00 parts of Elvax EP 250, to which preblend were added 25.60 parts of Elvax EP 3643, 19.10 parts of R-6 Nevindene, 9.55 parts of Piccovar L-30, 19.10 parts of Piccovar L-60 and 0.95 part of Ionox 330. After coating the adhesive onto various substrates, similar satisfactory results as described in Example 1 were obtained.

EXAMPLE 6

A pressure-sensitive hot melt adhesive was prepared substantially according to the method described in Example 1 from a preblend of 16.60 parts of Kraton 107 and 16.60 parts of Elvax EP 3643, to which preblend were added 16.60 parts of Elvax 40, 25.05 parts of Nevillac Hard, 25.10 parts of Piccovar L-30 and 0.05 part of Ionox 330. After coating the adhesive onto various substrates, similar satisfactory results as described in Example 1 were obtained.

Adhesives according to this invention, which are at least essentially 100% solids, have a Brookfield viscosity (No. 7 spindle at 300° F., 20 r.p.m.) in the range of about 25,000 to 150,000 c.p.s., preferably about 35,000 to 65,000 c.p.s.; a softening point (Ring and Ball, ASTM D-36-26) of at least about 200° F., preferably from about 225° F. to 275° F.; a penetration hardness (ASTM D-5-49, room temperature) in the range of about 0.35 cm. to 1.3 cm., preferably about 0.5 cm. to 0.8 cm.; and a loss on heating (ASTM D-6-39 T, 5 hours at 300° F.) of about 10% maximum, preferably below about 5%.

It will of course be understood that numerous modifications can be made in the ingredients, proportions and conditions described in the foregoing examples without departing from the scope of this invention as disclosed hereinbefore and as defined in the claims appended hereafter.

I claim:
1. A pressure-sensitive adhesive composition having instant room temperature tack, good cold flow resistance and good shear strength which comprises: as a first component, from about 20% to about 50% of a resinous copolymer of ethylene and vinyl acetate containing from about 15% to about 60% by weight of said copolymer of said vinyl acetate; as a second component, from about 10% to about 30% of a polystyrene-polybutadiene-polystyrene or a polystyrene-polyisoprene-polystyrene block copolymer whose polystyrene blocks have molecular weights of from about 5000 to about 125,000 and are from about 20% to about 80% by weight of said block copolymer, and whose polybutadiene or polyisoprene blocks have molecular weights of from about 15,000 to about 250,000; and as a third component, from about 25% to about 70% of an ethylene glycol, polyethylene glycol, glycerol or pentaerythritol rosin ester, hydrogenated rosin ester or methylated rosin ester, a coumarone-indene resin having a molecular weight of about 150 to about 800, a poly-($\alpha$-pinene) or a poly-($\beta$-pinene) resin, a diene-olefin aliphatic hydrocarbon resin having a molecular weight of about 800 to about 1800, or a homopolymeric polystyrene resin having a molecular weight of about 200 to about 6000, said percent values being by weight of the adhesive composition.

2. A pressure-sensitive adhesive composition according to claim 1 containing from about 30% to about 45% of said first component, from about 12% to about 18% of said second component, and from about 45% to about 60% of said third component.

3. A pressure-sensitive adhesive composition according to claim 1 wherein said ethylene/vinyl acetate copolymer component contains from about 30% to about 50% by weight of vinyl acetate.

4. A pressure-sensitive adhesive composition according to claim 1 wherein said polystyrene blocks have molecular weights of from about 8000 to about 45,000 and said polybutadiene or polyisoprene blocks have molecular weights of from about 35,000 to about 150,000.

5. A method of making a pressure-sensitive adhesive composition having instant room temperature tack, good cold flow resistance and good shear strength which comprises: masticating together as a first component from about 20% to about 50% of a resinous copolymer of ethylene and vinyl acetate which contains about 15% to about 60% by weight of said copolymer of said vinyl acetate, and as a second component from about 10% to about 30% of a polystyrene-polybutadiene-polystyrene or a polystyrene-polyisoprene-polystyrene block copolymer whose polystyrene blocks have molecular weights of from about 5000 to about 125,000 and are from about 20% to about 80% by weight of said block copolymer, and whose polybutadiene or polyisoprene blocks have molecular weights of from about 15,000 to about 250,000, to form a uniform preblend of them; melting said preblend to form a hot-melt mix thereof; and blending into said hot-melt mix, as a third component, from about 25% to about 70% of an ethylene glycol, polyethylene glycol, glycerol or pentaerythritol rosin ester, a hydrogenated rosin ester or a methylated rosin ester, a coumarone-indent resin having a molecular weight of from about 150 to about 800, a poly-($\alpha$-pinene) or a poly-($\beta$-pinene) resin, a diene-olefin aliphatic hydrocarbon resin having a molecular weight of about 800 to about 1800, or a homopolymeric polystyrene resin having a molecular weight of from about 200 to about 6000, to form a homogeneous adhesive composition; said percent values being by weight of said adhesive composition.

6. A method of making a pressure-sensitive adhesive composition according to claim 5 wherein said preblend is formed at a temperature of from about 60° F. to about 150° F., and said homogeneous adhesive is blended at a temperature of from about 270° F. to about 400° F.

7. A method of making a pressure-sensitive adhesive composition according to claim 5 wherein said first component is used in an amount of from about 30% to about 45%, said second component is used in an amount of from about 12% to about 18%, said third component is used in an amount of from about 45% to about 60%.

8. A method of making a pressure-sensitive adhesive composition according to claim 5 wherein the amount of said first component preblended with said second component is from about one-half to about equal the amount of said second component, and the remainder of said first component is blended into said hot-melt mix.

9. A method of making a pressure-sensitive adhesive composition according to claim 5 wherein said ethylene/vinyl acetate copolymer component contains from about to about 50% by weight of vinyl acetate.

10. A method of making a pressure-sensitive adhesive composition according to claim 5 wherein said polystyrene blocks have molecular weights of from about 8000 to about 45,000 and said polybutadiene or polyisoprene blocks have molecular weights of from about 35,000 to about 150,000.

11. A method of making a pressure-sensitive adhesive composition according to claim 8 which further comprises blending said remainder of said first component into said hot-melt mix prior to blending said third component therein.

References Cited

UNITED STATES PATENTS

| | | | |
|---|---|---|---|
| 2,492,760 | 12/1949 | Murphy et al. | 260—27 |
| 2,664,378 | 12/1953 | Heller | 260—27 |
| 3,239,478 | 3/1966 | Harlan | 260—27 |

OTHER REFERENCES

Reichhold Chemicals Inc., "RCI technical bulletin," 1965.

HOSEA E. TAYLOR, Primary Examiner

W. E. PARKER, Assistant Examiner

U.S. Cl. X.R.

260—93.3, 829, 846, 876, 879

UNITED STATES PATENT OFFICE
CERTIFICATE OF CORRECTION

Patent No. 3,630,980            Dated December 28, 1971

Inventor(s) Thomas E. Russell

It is certified that error appears in the above-identified patent and that said Letters Patent are hereby corrected as shown below:

Column 2, line 24, after "20%" insert -- to about 50% --; line 66, beginning with "Stabelite" cancel all to and including "Company" in column 3, line 4. Column 6, line 69, before "to" insert -- 30% --.

Signed and sealed this 4th day of July 1972.

(SEAL)
Attest:

EDWARD M. FLETCHER, JR.           ROBERT GOTTSCHALK
Attesting Officer                  Commissioner of Patents

PO-1050
(5/69)

UNITED STATES PATENT OFFICE
CERTIFICATE OF CORRECTION

Patent No. 3,630,980          Dated 12/28/71

Inventor(s) Thomas E. Russell

It is certified that error appears in the above-identified patent and that said Letters Patent are hereby corrected as shown below:

Col. 2, line 24, after "20%" insert -- to about 50% --; Col. 2, line 66, delete entire line; Col. 3, lines 3-4, delete ", all sold by Hercules Powder Company"; Col. 6, line 69, before "to" insert -- 30% --.

This certificate supersedes Certificate of Correction issue July 4, 1972.

Signed and sealed this 28th day of November 1972.

(SEAL)
Attest:

EDWARD M. FLETCHER, JR.
Attesting Officer

ROBERT GOTTSCHALK
Commissioner of Patents